INVENTORS
W. M. BALDWIN
R. MONROE Jr.
By D. W. Marks
ATTORNEY 3,669,635
TANTALUM ANODES AND METHOD
OF PRODUCING
Wiley M. Baldwin, Winston-Salem, and Raymond Monroe, Jr., Clemmons, N.C., assignors to Western Electric Company, Incorporated, New York, N.Y.
Filed June 11, 1969, Ser. No. 837,992
Int. Cl. B22f 3/00
U.S. Cl. 29—182  6 Claims

ABSTRACT OF THE DISCLOSURE

A tantalum anode having a high CV per unit weight is produced by blending tantalum powder and a mixture of tantalum oxide and carbon. The mixture is heated in a vacuum to produce tantalum anodes.

CROSS REFERENCE TO RELATED APPLICATION

This application is related to an application, Ser. No. 830,866, filed in the name of W. M. Baldwin on June 5, 1969.

BACKGROUND OF THE INVENTION (1) Field fo the invention

This invention is directed to a tantalum anode and a method of producing the anode. In the manufacture of tantalum anodes, it is desirable that the anodes be as porous as possible to produce the maximum amount of capacitance per unit weight and unit volume of tantalum.

(2) Description of the prior art

One prior art process for producing porous tantalum anodes utilizes a tantalum powder which is pressed into a pellet and then heated to form a porous tantalum anode. Another prior art process utilizes a mixture of tantalum oxide powder and carbon powder which is pressed into a pellet and then heated to form a porous tantalum anode.

In both of these prior art processes, an organic binder such as polyethylene glycol, e.g., that manufactured under the name Carbowax by the Union Carbide Corp., is mixed with the powders to (1) provide green strength to the anodes, and (2) add the lubrication necessary when the anodes are formed with a die. The polyethylene glycol binder is vaporized by heating in a vacuum prior to or concurrent with the sintering of the tantalum anode.

SUMMARY OF THE INVENTION

An object of the present invention is a new and improved process for producing a new and improved anode.

In accordance with this and other objects of the invention, a mixture of tantalum oxide-carbon powder is mixed with pure tantalum powder to produce a tantalum anode having an unexpected increase in CV per unit weight.

DESCRIPTION OF THE DRAWING

The nature of the present invention and its various advantages will appear more fully by referring to the following detailed description in conjunction with the appended drawing, in which.

DETAILED DESCRIPTION

In the above-mentioned application of W. M. Baldwin, there is described a new mixture of finely divided tantalum oxide-carbon powder from which porous tantalum anodes may be produced. Briefly, the mixture of tantalum oxide-carbon powder is made by (1) mixing colloidal carbon with a solution of a soluble salt of tantalum, such as tantalum oxalate, (2) spray drying the mixture, and (3) heating the mixture to a temperature high enough to decompose the soluble salt of tantalum to tantalum oxide but low enough to avoid oxidation of the carbon. Preferably, the quantity of carbon added in step (1) is calculated to reduce between 95 and 100% of the tantalum oxide in step (3) according to the following reaction:

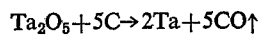

$$Ta_2O_5 + 5C \rightarrow 2Ta + 5CO\uparrow$$

Surprisingly, it has been discovered that when this new powder mixture of tantalum oxide and carbon is mixed with pure tantalum powder an unexpected increase in CV per unit weight occurs in capacitors produced therefrom. This unexpected increase in CV per unit weight is greatest when the pure tantalum powder is a low capacitive powder which is usually less expensive. A low capacitance powder mixed with the tantalum oxide-carbon powder can produce a CV per unit weight which previously was only obtainable by use of high capacitance tantalum powders. A lesser increase in CV per unit weight occurs when the tantalum oxide-carbon powder is mixed with a high capacitance pure tantalum powder.

Figure 1:
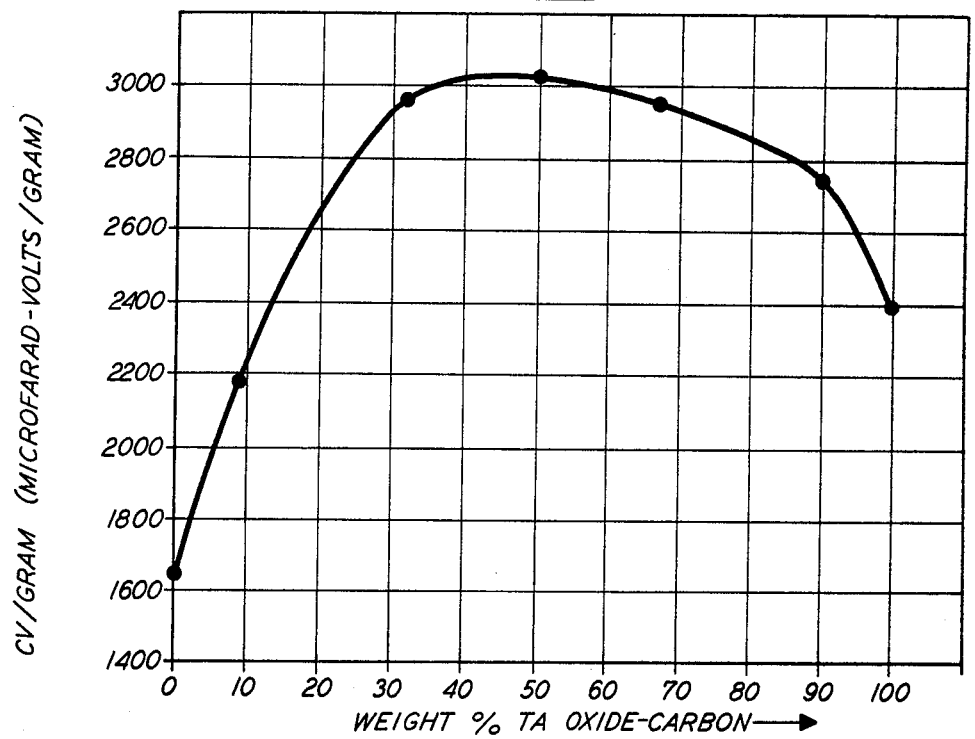
FIG. 1 is a diagram of the variation in CV per gram product of anodes produced in accordance with the invention as a function of the percentage by weight of tantalum oxide and carbon which is mixed with tantalum powder.

Referring to FIG. 1, there is shown a graph illustrating this unexpected increase in CV per unit weight. The CV per unit weight of the pure tantalum powder anodes is approximately 1650 microfarad volts per gram while the CV per unit weight of anodes produced solely from the tantalum oxide and carbon powder is approximately 2400 microfarad volts per gram. However, anodes produced from a mixture of 50% pure tantalum powder and 50% tantalum oxide and carbon powder by weight results unexpectedly in a CV per unit weight in excess of 3000 microfarad volts per gram.

One additional advantage of the use of a mixture of pure tantalum powder and tantalum pentoxide-carbon powder is that for certain percentages of tantalum powder and carbon it is unnecessary to utilize an organic binder for providing lubrication when pressing the green anodes and for providing strength to the green anodes. Generally, the percentage of tantalum oxide and carbon powder must exceed 5% and preferably exceed 10% to provide the necessary lubrication and strength to the green anode. Large percentages of the tantalum oxide-carbon powder introduces additional shrinkage when the green anode is heated to react the carbon with the tantalum oxide to produce pure tantalum. This additional shrinkage may produce cracks in the sintered anode which may be undesirable in some instances. Generally, keeping the percentage of tantalum oxide-carbon powder below 50% and preferably below 40% will avoid excessive shrinkage and cracking.

Figure 2:
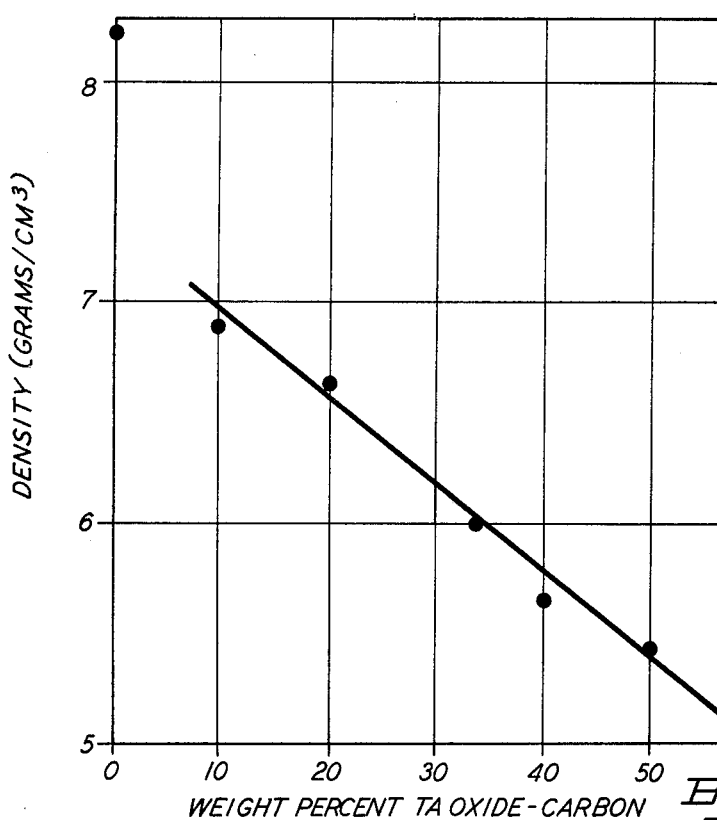
FIG. 2 is a diagram of the variation in density of tantalum anodes produced in accordance with the invention as a function of percentage by weight of tantalum oxide and carbon which is mixed with tantalum powder.

The green anode made from a mixture of tantalum oxide-carbon powder and pure tantalum powder is heated in a vacuum furnace to a temperature generally in the range of 1200 to 2900° C. and preferably 1800 to 2200° C. to react the carbon with the tantalum oxide and to sinter the tantalum powder to produce a rigid porous anode. FIG. 2 illustrates the reduction in density of the finished anode with increasing percentages of tantalum oxide-carbon powder.

While preferably the tantalum oxide-carbon powder is produced by the process described in the above-mentioned application of W. M. Baldwin, it is believed that other tantalum oxide-carbon mixtures, such as a mixture of separately formed tantalum oxide and carbon powder, will produce similar results so long as the average particle size is generally less than 10 microns.

What is claimed is:

1. A method of producing a tantalum anode, comprising:
    mixing tantalum oxide powder and carbon powder with tantalum powder;
    pressing the mixture into a predetermined shape; and
    heating the pressed mixture to reduce the tantalum oxide and sinter the tantalum to produce a porous tantalum anode.

2. A method of producing a tantalum anode as defined in claim 1, wherein:
    the quantity of tantalum powder is 50 to 95 percent by weight of the mixture; and
    the quantity of carbon is selected to reduce between 95 to 100 percent of the tantalum oxide to tantalum.

3. A method of producing a tantalum anode as defined in claim 1, wherein:
    the quantity of tantalum powder is 60% to 90% by weight of the mixture;
    the quantity of carbon is selected to reduce between 95 to 100 percent of the tantalum oxide to tantalum; and
    the tantalum oxide has an average particle size less than 10 microns.

4. A tantalum anode produced by a process as defined in claim 1.

5. A tantalum anode produced by a process as defined in claim 2.

6. A tantalum anode produced by a process as defined in claim 3.

References Cited

UNITED STATES PATENTS

| 3,453,105 | 7/1969 | Flaks et al. | 75—211 |
| 2,205,386 | 6/1940 | Balke et al. | 75—211 |

OTHER REFERENCES

Powder Metallurgy, Practice & Applications, Sands and Shakespeare, 1966, William Clowes and Sons, Limited, London and Beccles, pp. 231–2.

CARL D. QUARFORTH, Primary Examiner

B. H. HUNT, Assistant Examiner

U.S. Cl. X.R.

75—200, 222